US007505905B1

(12) United States Patent
Zimmerman et al.

(10) Patent No.: US 7,505,905 B1
(45) Date of Patent: Mar. 17, 2009

(54) IN-THE-FIELD ADAPTATION OF A LARGE VOCABULARY AUTOMATIC SPEECH RECOGNIZER (ASR)

(75) Inventors: Roger Scott Zimmerman, Wellesley, MA (US); Gary Neil Tajchman, Mansfield, MA (US); Ian Scott Boardman, Arlington, MA (US); Hejko Willy Rahmel, Carrollton, TX (US); Thomas B. Schalk, Plano, TX (US)

(73) Assignee: Nuance Communications, Inc., Burlington, MA (US)

( * ) Notice: Subject to any disclaimer, the term of this patent is extended or adjusted under 35 U.S.C. 154(b) by 1148 days.

(21) Appl. No.: 09/311,333

(22) Filed: May 13, 1999

(51) Int. Cl.
*G10L 15/20* (2006.01)
(52) U.S. Cl. .................................................. 704/244
(58) Field of Classification Search ......... 704/243–245, 704/255–257, 270, 275
See application file for complete search history.

(56) References Cited

U.S. PATENT DOCUMENTS 5,199,077 A * 3/1993 Wilcox et al. ............... 704/256
5,835,890 A 11/1998 Matsui et al. ............... 704/255
6,208,964 B1 * 3/2001 Sabourin .................... 704/244

OTHER PUBLICATIONS

Chris Rowden, Speech Processing, 1992, McGraw-Hill Book company Europe, pp. 228-238.*
Miyazawa Y et al: "Unsupervised Speaker Adaptation Using All-Phoneme Ergodic Hidden Markov Network" IEICE Transactions on Information and Systems, JP, Institute of Electronics Information and Comm. Eng. Tokyo, vol. E78-D, No. 8, Aug. 1, 1995, pp. 1044-1050.

* cited by examiner

*Primary Examiner*—David D Knepper
(74) *Attorney, Agent, or Firm*—Bromberg & Sunstein, LLP

(57) ABSTRACT

A technique for improving the recognition accuracy of a speech recognizer includes deploying the speech recognizer, wherein live input data is received by the recognizer as an input for a given speaker independent adaptation algorithm associated with the speech recognizer. The algorithm enhances the accuracy of the speech recognizer without human supervision. This technique is particularly suitable for adapting a large vocabulary ASR engine.

16 Claims, 3 Drawing Sheets

IN-THE-FIELD ADAPTATION OF A LARGE VOCABULARY AUTOMATIC SPEECH RECOGNIZER (ASR)

BACKGROUND OF THE INVENTION

1. Technical Field

The present invention relates generally to automatic speech recognition (ASR) and, more particularly, to the process of tuning a speech recognition engine to improve its accuracy.

2. Description of the Related Art

Speech recognition is an imperfect art. Achieving high accuracy is difficult because multiple variables typically exist including, e.g., differences in microphones, speech accents, and speaker abilities. When Automatic Speech Recognition is performed over a telephone network, the task is even more difficult, owing to the noise and bandwidth limitations imposed on the speech signal.

It is known in the prior art to tune a speech recognition engine to increase the engine's level of accuracy. In the simplest example, speaker adaptation, such tuning is effected in a completely supervised manner, with the user of the system being prompted to read given text over a period of time. During this process, the speech recognizer is adapted to the user's voice. Examples of this approach are found in many commercial products, such as Dragon Dictate. These techniques generally require several minute sessions between the user and the system, and they are therefore inappropriate to telephone-based ASR, where most interactions last only a few utterances and the user identity usually cannot be saved for future sessions.

For larger, speaker-independent systems, tuning the recognizer to individual speakers is not practical or desirable. The goal of tuning such systems is to arrive at generally applicable models and algorithms. Nor is it possible in these systems to conduct any supervised sessions with the user population. In such cases, ASR providers tune their algorithms using human intervention. In particular, after the recognizer is deployed, a large quantity of speech data is collected. Human listeners then transcribe this speech data. Transcription requires careful and skilled listening to each utterance in the database, as well as excellent typing ability. Using the speech data and the human-provided transcriptions, the ASR provider then tunes the recognition engine as necessary and re-deploys the application. This type of tuning is not economical, and it is often not rapid enough to be useful in deploying large vocabulary ASR systems. Indeed, as the size of the vocabulary increases, such "supervised" tuning techniques become more inefficient and can fail to bring the system up to desired level of accuracy in a practical amount of development time and expense. The present invention addresses this problem.

BRIEF SUMMARY OF THE INVENTION

It is a primary object of the present invention to improve the global recognition accuracy at an ASR installation in an automated manner.

It is another primary object of this invention to bring an ASR algorithm up to an acceptable accuracy level in the field and without direct supervision.

Another important object of this invention is to provide a novel method of tuning a large vocabulary speech recognition engine in an economical and reliable manner. These and other objects of the invention are provided by tuning the ASR engine in a completely automated manner. In particular, the speech recognition results from the recognizer, which typically is imperfect when first deployed, are used to train or tune one or more aspects of the ASR model and algorithm. This in-the-field adaptation depends on the recognizer to transcribe the database, as opposed to a human listener. It then relies on automated tuning techniques to actually modify the algorithm, as opposed to expert human algorithm developers.

Thus, according to the present invention, the imperfect output of the recognizer itself is preferably the only information used to supervise the transcription of live input speech data. This data is then analyzed by one or more adaptation algorithms, and the recognizer is re-tuned as necessary to increase its recognition accuracy.

The invention provides a unique method for adapting a speaker-independent ASR algorithm to a given application or environment in an unsupervised manner in the field. To tune the ASR, one or more site adaptation algorithms are used, either singularly or in combination. These are preferably speaker-independent algorithms that are intended to learn such application-specific features as channel characteristics, dialects, pronunciation idiosyncrasies, and speaking style. The adaptation may be performed on the acoustic model (e.g., Hidden Markov Models), the language model (e.g., Word Bigram Statistics), the pronunciation model (e.g., phonetic dictionary), or combinations thereof.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawing in which.

DETAILED DESCRIPTION OF THE PREFERRED EMBODIMENT

Figure 1:
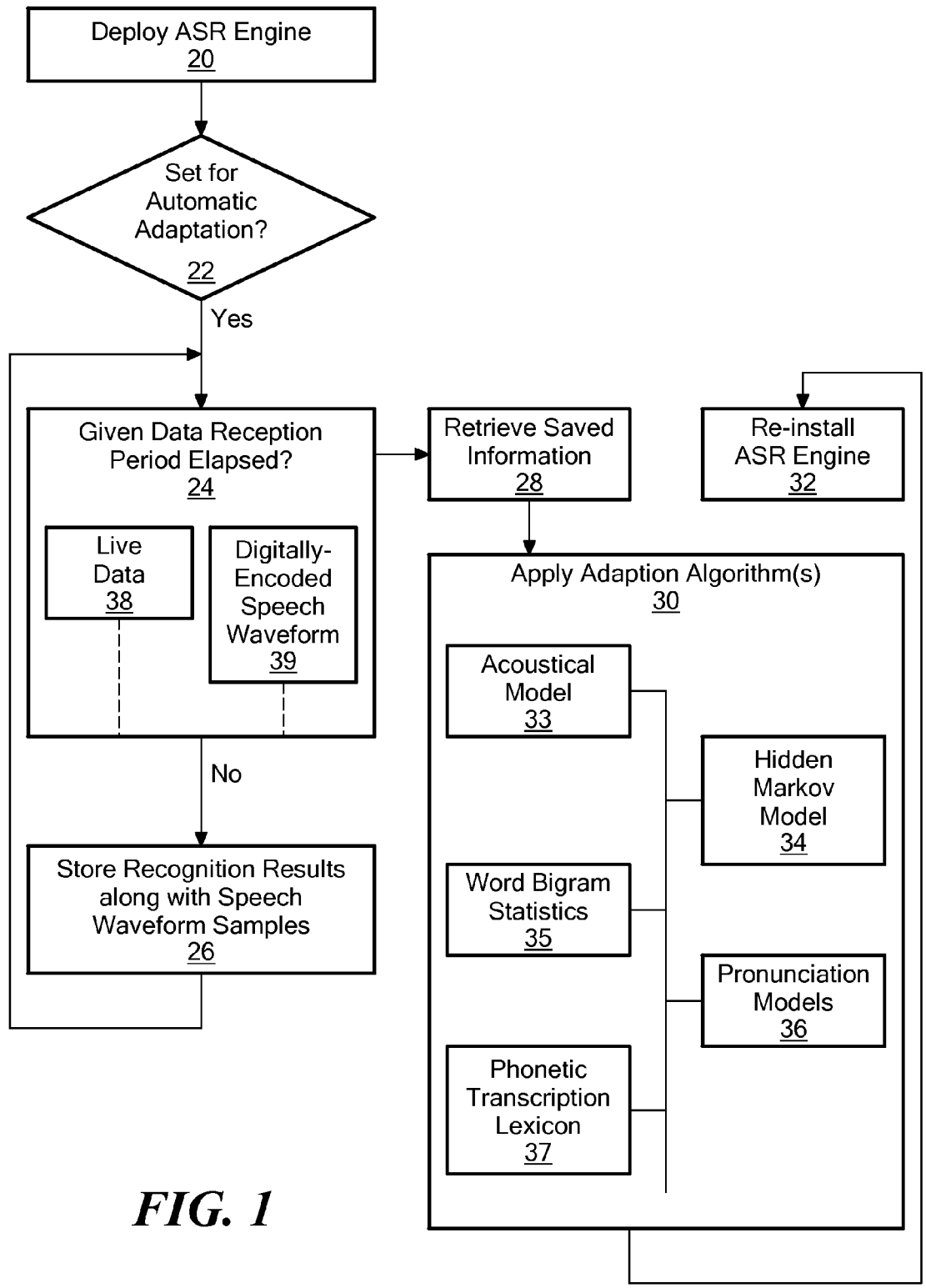
FIG. 1 is a flowchart illustrating the in-the-field adaptation technique in accordance with the present invention.

FIG. 1 illustrates a flowchart of the in-the-field adaptation methodology of the present invention. The invention assumes that an ASR engine has been deployed at a user installation and that the provider desires to enhance the recognition accuracy of the engine, preferably without human intervention. In one preferred implementation, the invention is used with an ASR engine having a large vocabulary, although this is not a requirement. Thus, for example, the ASR application is a directory assistance database, which is comprised of a large number (e.g., several thousand) vocabulary items.

The routine begins at step 20 by deploying the ASR engine, for example, at a customer installation in the field. It is assumed that the ASR engine as initially deployed is imperfect and must be tuned to increase its accuracy level. At step 22, a test is run to determine whether the ASR engine has been set for automatic adaptation according to the invention. This may be achieved, for example, by extending the engine's application programming interface (API) to include a flag that may be set (e.g., by the application developer or the user) to begin the adaptation process. The flag may be set remotely after the engine has been deployed. If the engine has been set for automatic adaptation, the routine continues in step 24. At this step, a test is made to determine whether a given data-collection period (e.g., a 24 hour period) has elapsed. If not, the routine continues at step 26 to store the recognition results, along with the associated speech waveform samples. In particular, during this step, the recognition results obtained by processing a live input 38 are saved to a disk file. As will be seen, the recognition results may include the actual results (i.e., the hypothesized spoken utterances) generated by the ASR engine, together with information such as confidence levels, n_best hypotheses, and other data which might be used as input to the adaptation algorithms in step 30.

In a variant of step 26, the system may be configured to save a "downstream" version of the speech data (e.g., cepstral coefficients), instead of the "raw" digitized speech waveform samples 39. This is another advantage of the present invention. In particular, because there is no requirement for humans to listen to the speech data, significant data-reduction may be obtained by storing only the form of the speech data that is required for executing the adaptation algorithms. This advantage can result in reduction in costs for computer equipment, including CPUs, IC memory, and hard disks.

Step 26 cycles until the result of the test at step 24 is positive. At this point, the routine continues at step 28 to retrieve the information saved during the time period. At step 30, an adaptation algorithm (or a plurality of adaptation algorithms) is executed against the information to increase the accuracy of the engine. As will be seen, this algorithm may be based on an acoustic model 33 (e.g., Hidden Markov Modeling 34), a language model (e.g., Word Bigram Statistics 35), a pronunciation model 36 (e.g., Phonetic Transcription 37), or some combination of these different model types. At step 32, the so-tuned recognition engine is then re-installed in the application, presumably with better accuracy and more efficient use of computing resources than the original engine.

This completes the basic processing. Of course, the entire basic process may be repeated, so that the recognition continually improves, and also so that the models are able to adapt to changes in the application conditions that might affect recognition performance.

Thus, according to the present invention, the recognition engine itself performs transcriptions of the live input data and then utilizes such information, along with some form of the original speech signal, as the input to an adaptation algorithm. The ASR engine is thus tuned in an unsupervised manner to a given application or operating environment in the field, and without human intervention.

While batch processing of the collected recognition results is preferred, one of ordinary skill in the art will appreciate that, if sufficient computational and memory resources exist, the adaptation routine can be exercised against the recognition data on-the-fly, namely, as live input data is being recognized.

The adaptation algorithms are preferably speaker-independent, and they are selected to enable the ASR engine to learn such application-specific features as channel characteristics, dialects, pronunciation idiosyncrasies, and speaking style, among others. One type of algorithm is a Hidden Markov Model adaptation, in which the mean-vectors and covariance matrices of the acoustic model are updated according to the acoustic input and corresponding speech states, hypothesized by the un-tuned recognizer. Another type of algorithm is a Word Bigram Statistics adaptation, which is a language model that updates lattice probabilities according to presumed word sequences. Another representative algorithm type is a phonetic transcription adaptation, which is a pronunciation model that updates a lexicon with alternative transcriptions generated, for example, from a text-to-phoneme engine and pruned according to the new data.

Finally, it is well-known that many current ASR search algorithms are parametric. Examples of such algorithms are Viterbi beam searches, stack decoders, and A-star searches. In such algorithms, there are many parameters that could potentially be tuned according to the above method. For example, the beam-width and the pruning-threshold could be adjusted in a Viterbi beam-search algorithm so that the search performs more optimally in a given environment. Also, in a multiple pass search algorithm where the scores from each pass over the utterance are combined to give a final score, the method for combining such scores is usually parametric and thus could be tuned according to this method. The present invention described a general technique for adapting the parameters in such ASR search algorithms.

One of ordinary skill in the art will recognize that the above-described approaches (which are merely exemplary) are potentially orthogonal. Thus, an additive benefit may be realized according to the invention by combining two or more of these methods in a single algorithm. Of course, these methods are not meant to be taken as an exhaustive list of approaches to in-the-field adaptation according to the invention.

The following experimental data illustrates that in-the-field adaptation is useful for improving the field performance of a recognition algorithm.

EXPERIMENTAL

HMM Model Adaptation

Figure 2:
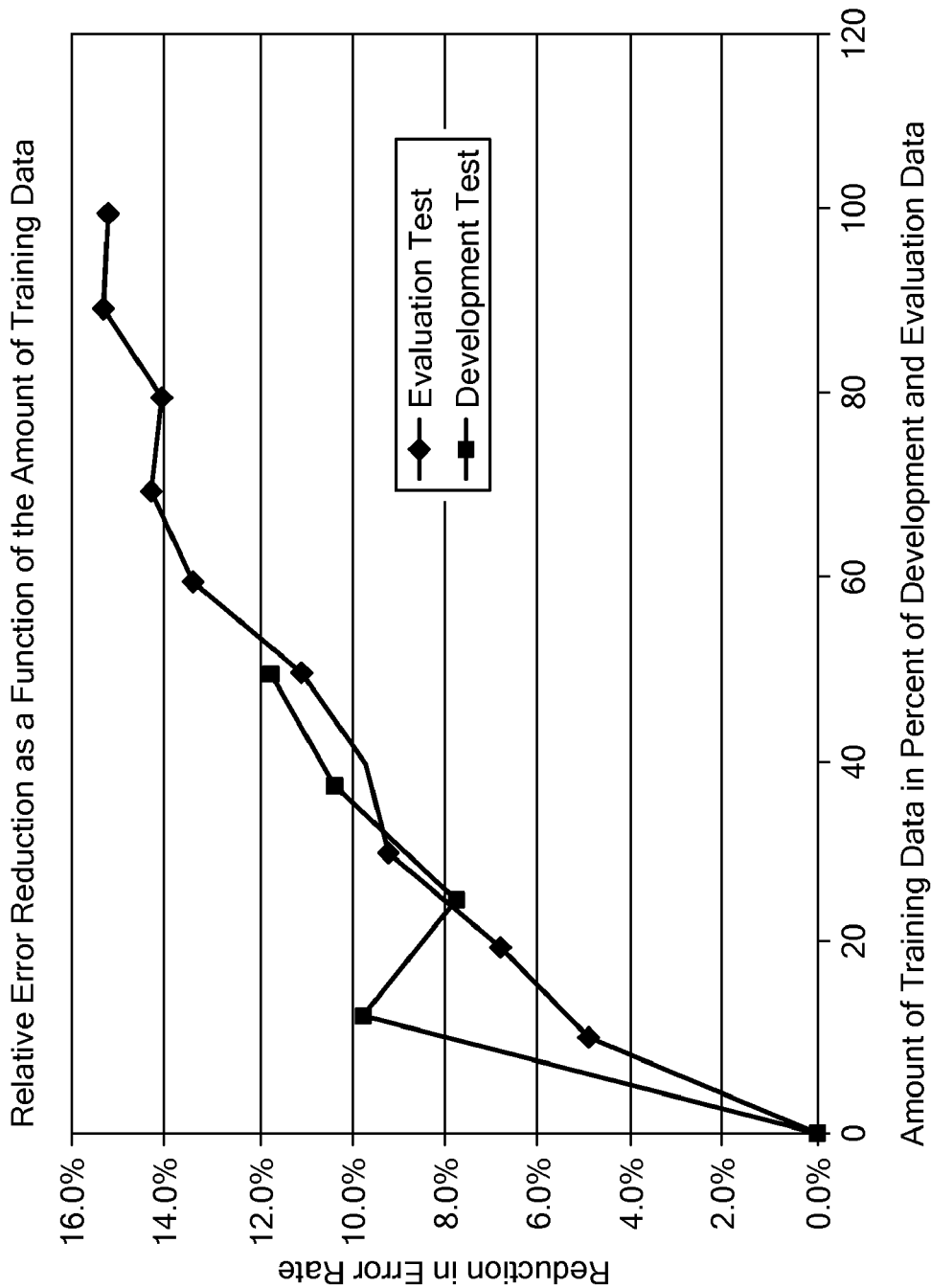
FIG. 2 is a graph illustrating a relative error reduction as a function of an amount of training data according to a Hidden Markov Modeling (HMM) adaptation algorithm.

In HMM adaptation, the newly captured data is processed through a traditional Baum-Welch embedded re-estimation algorithm, with only the mean vectors allowed to be updated. (An alternative implementation, probably requiring more adaptation data, would also update the covariance vectors for each state.) As is central to the unsupervised adaptation method disclosed herein, the best recognition hypothesis for each utterance was used as the presumed orthographic transcription. Then, the normal Baum-Welch re-estimation algorithm was applied, allowing only the mean vectors of each Gaussian model to be updated. As with the other adaptation approaches described below, several variations on this basic scheme were explored. First the amount of adaptation data was varied, from about 40 minutes of speech, up to four hours. Second, several confidence thresholds were applied, including a confidence gap, wherein only utterances within the two confidence levels were included in the adaptation process. FIG. 2 illustrates the results from this experimentation.

As can be seen, the HMM adaptation behaves extremely nicely. The more training data that is used to adapt, the more relative error reduction is achieved. The improvement is virtually identical for the development and evaluation test sets, showing that no over-training has taken place. A baseline test was also run on a database that was substantially similar in character to the original training data used to develop the un-tuned recognizer. This test showed only a small decrease in accuracy, suggesting that the method is fairly robust and that it will not impact recognition performance should there be a sudden change in the application characteristics. Also, there was no significant difference in CPU performance between the baseline and adapted HMM tests.

Word Bigram Statistics Adaptation

For these experiments, the ASR engine's first-pass Viterbi search graph was biased with word bigram data extracted from subsets of the recognition results on given development input data. The result transcriptions (i.e., recognition hypotheses) were randomized and then various sized portions, starting from the top-choice down, were taken to accumulate word pair frequencies. A variation on this experiment imposed a score threshold on the recognition results as the sub-setting mechanism. These counts were converted into probabilities, and these probabilities were used to bias the Viterbi search in favor of the most likely word sequences. The main results of these experiments are summarized in the tables 1A and 1B illustrated below:

| | Inclusion | |
|---|---|---|
| N | Baseline | Adapted Subset |
| 1 | 60.45 | 64.86 |
| 2 | 72.01 | 75.28 |
| 3 | 76.37 | 79.15 |
| 5 | 80.33 | 82.60 |
| 10 | 84.03 | 86.12 |
| 20 | 86.94 | 89.10 |
| 50 | 87.71 | 89.66 |

TABLE 1A

Recite First-Pass Results on AT & T Dev, Baseline (B) vs. Adapted (A/S) Word Bigram Priors (A = All Dev Test Data, S = Subset Result for confidence > 0.2)

| | | | Word Stats | | | | | Sent Stats | | | |
|---|---|---|---|---|---|---|---|---|---|---|---|
| | WER | SER | Corr | Rej | Sub | Del | Ins | Rej | Sub | #Wrd | #Snt |
| B | 34.07 | 38.81 | 72.75 | 1.31 | 22.61 | 3.33 | 6.82 | 1.19 | 37.62 | 10281 | 4447 |
| A | 28.04 | 31.21 | 77.86 | 1.31 | 17.84 | 2.99 | 5.90 | 1.19 | 30.02 | 10281 | 4447 |
| S | 30.21 | 33.96 | 75.52 | 1.31 | 19.82 | 3.35 | 5.73 | 1.19 | 32.76 | 10281 | 4447 |

| | Inclusion | | |
|---|---|---|---|
| N | Baseline | Adapted | Subset |
| 1 | 61.19 | 68.79 | 66.04 |
| 2 | 71.73 | 77.39 | 75.20 |
| 3 | 76.03 | 83.50 | 78.86 |
| 5 | 79.78 | 83.00 | 82.51 |
| 10 | 83.79 | 85.47 | 85.90 |
| 20 | 86.37 | 87.23 | 88.33 |
| 50 | 87.07 | 87.79 | 89.07 |

| | | CPU Performance | | | | |
|---|---|---|---|---|---|---|
| | #sent | #seg/utt | #bnd/utt | #pushes/utt | #usecs/utt | RT-MHz (P233) |
| B | 4394 | 353.0 | 60.3 | 7.575e+05 | 1.883 | 85.1 |
| A | 4394 | 353.0 | 60.3 | 5.914e+05 | 1.889 | 85.4 |
| S | 4394 | 353.0 | 60.3 | 6.539e+05 | 1.983 | 89.6 |

| | CPU Performance | | |
|---|---|---|---|
| | #pushes/utt | #usecs/utt | RT-MHz (P233) |
| B | 7.575e+05 | 1.883 | 85.1 |
| S | 6.443e+05 | 1.862 | 84.2 |

The main conclusion from these experiments is that recognition results obtained in the field can be used to improve recognition accuracy simply by accumulating the results and recompiling the Viterbi search graph loaded by the recognizer. It is also seen that, as with the HMM adaptation, using the bigram-weighted search graph does not increase CPU consumption.

An extension to the adaptation of word bigram statistics is to adapt word trigram statistics. Indeed, with sufficient adaptation data, this technique may be extended to any of the well-known statistical approaches to language modeling.

TABLE 1B

Recite First-Pass Results on AT & T Eval, Baseline (B) vs. Adapted (S) Word Bigram Priors (S = Subset for confidence > 0.2)

| | | | Word Stats | | | | | Sent Stats | | | |
|---|---|---|---|---|---|---|---|---|---|---|---|
| | WER | SER | Corr | Rej | Sub | Del | Ins | Rej | Sub | #Wrd | #Snt |
| B | 34.98 | 39.55 | 72.14 | 0.87 | 23.49 | 3.49 | 7.04 | 0.89 | 38.66 | 10016 | 4402 |
| S | 31.38 | 35.14 | 74.67 | 0.87 | 20.92 | 3.54 | 6.05 | 0.89 | 34.26 | 10016 | 4402 |

Moreover, the same basic technique could be applied to deterministic language models, such as BNF-driven context-free grammars.

Phonetic Transcription Adaptation

Another experiment involved adapting phonetic transcriptions in the ASR dictionary. This was accomplished using the following general procedure:

1) A statistical text-to-phoneme algorithm was used to develop a letter-to-phoneme decision-tree, derived from a large U.S. English training lexicon. This decision-tree creates a one-to-many mapping of orthographic spellings to phonetic transcription alternatives, thus over-generating phonetic transcriptions for a given vocabulary item.

2) This decision-tree was then applied to the test dictionary, producing a probability-ranked list of alternative phonetic transcriptions for each lexical item in the vocabulary.

3) These alternative transcriptions were first pruned to a reasonable number per lexical item, e.g., 20.

4) Then, these ranked lists were filtered again, by removing phonotactically improbable entries.

5) Next, the key adaptation step was run. The newly expanded lexicon is used in a forced phonetic alignment on the adaptation data. As with the other techniques, the recognition hypotheses were assumed to be the correct transcription for each utterance. This step therefore uses the adaptation data to select the most appropriate transcriptions from the expanded lexicon. Transcriptions that were infrequently used or not used at all in the forced alignment were filtered out of the expanded lexicon, reducing the average number of transcriptions from about 18 to about 2, which is typical for large-vocabulary ASR dictionaries.

6) Then, the transcriptions selected by this forced alignment procedure were used to supplement the standard phonetic transcription lexicon.

7) New tests were then run with this expanded (i.e. adapted) lexicon.

The tables 2A and 2B below show the experimental results for the Names task:

TABLE 2A

Recite First-Pass Results on IVPATT613 Dev,
Baseline vs. Adapted Transcriptions

| UC 1 | UC 2 | UC 3 | UC 10 | UC 20 | Lexicon* |
|---|---|---|---|---|---|
| 86.3 | 91.4 | 93.1 | 95.3 | 96.0 | baseline |
| 88.0 | 93.2 | 94.7 | 97.3 | 97.8 | reqnames__dt+std.fa__prons.+std |
| 88.5 | 93.5 | 95.0 | 97.4 | 97.8 | gen+names__dt+std.fa__prons.+std |

*Lexicon Descriptions:
  reqnames__dt+std.fa__prons.+std:
    request_names trained DT to generate alternate transcriptions
    added standard transcriptions (official IVPATT dev dict)
    filtered with a forced alignment over the DEV data
    added standard transcriptions again to create final recognition lexicon
  gen+names__dt+std.fa__prons.+std:
    sames as reqnames, except used gen+names to train DT

TABLE 2B

Recite First-Pass Results on IVPATT613 Eval,
Baseline vs. Adapted Transcriptions

| UC 1 | UC 2 | UC 3 | UC 10 | UC 20 | Lexicon* |
|---|---|---|---|---|---|
| 89.1 | 93.2 | 94.5 | 96.6 | 97.2 | baseline |
| 89.2 | 93.4 | 94.6 | 97.3 | 97.9 | reqnames__dt+std.fa__prons.+std |

TABLE 2B-continued

Recite First-Pass Results on IVPATT613 Eval,
Baseline vs. Adapted Transcriptions

| UC 1 | UC 2 | UC 3 | UC 10 | UC 20 | Lexicon* |
|---|---|---|---|---|---|
| 89.4 | 93.9 | 95.1 | 97.3 | 98.1 | gen+names__dt+std.fa__prons.+std |

*Lexicon Descriptions:
  reqnames__dt+std.fa__prons.+std:
    request_names trained DT to generate alternate transcriptions
    added standard transcriptions (official IVPATT dev dict)
    filtered with a forced alignment over the DEV data
    added standard transcriptions again to create final recognition lexicon
  gen+names__dt+std.fa__prons.+std:
    sames as reqnames, except used gen+names to train DT For the development test, the expanded lexicon obtained a 16.1% relative improvement over the standard lexicon. This same pattern of results held for the evaluation test set, but the improvement was not as large.

It may also be desirable to begin to perform adaptation data filtering based on recognition confidence, as was done in the other in-the-field adaptation experiments. Further, it may be desired to implement variations on generating the text-to-phoneme decision-tree, including tailoring it to specific lexicon types, and, in the context of a names task, using different decision-trees for different linguistic groupings. Or other methods could be employed for generating alternative phonetic transcriptions, including phonological-based approaches.

Combined Approaches

Figure 3:
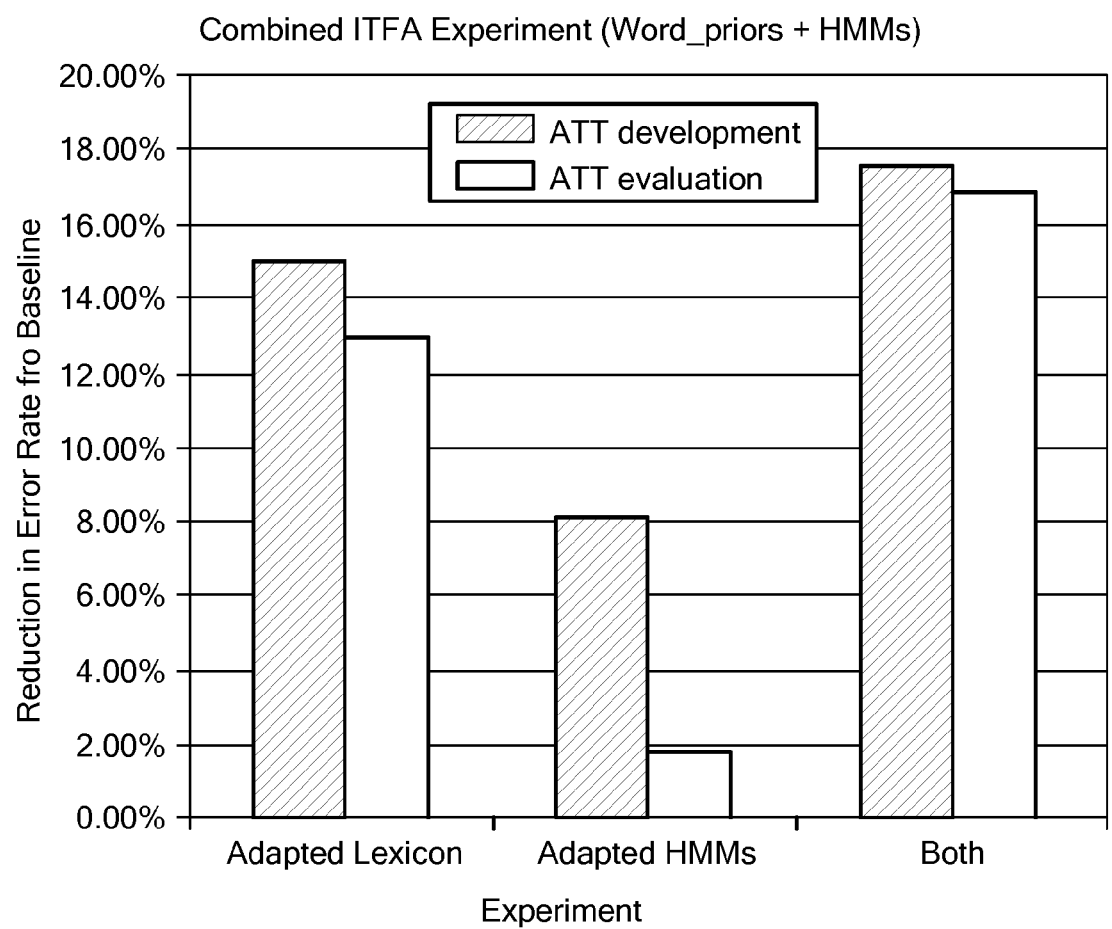
FIG. 3 is a graph illustrating the results of combining two adaptation algorithms, the HMM adaptation, and the Word Bigram Statistics adaptation.

As described earlier, each of the above approaches is fairly orthogonal. Thus, two or more of these adaptation methods may be combined to produce an additive benefit. A simple combination of the HMM and Bigram adaptation generated the results illustrated in FIG. 3. Combining these adaptation algorithms had a somewhat less than additive effect on the development test data, and a somewhat more than additive effect on the evaluation test data. The combined improvement in both cases approached 18%.

CONCLUSIONS

The experimental data demonstrates the plausibility of all three model adaptation methods. Generalizing, these approaches showed a recognition error reduction of nearly 20%, using a combination of two of these approaches, on a real-world test database.

The unsupervised adaptation paradigm of the present invention has many advantages over the prior art. Foremost, it does not require human intervention to supervise the transcriptions of the live input data. Moreover, adaptation may be effected even on limited data. The results illustrated above reflect that limited amounts of data can be sufficient to demonstrate improvements. Further, screening the recognition hypotheses with confidence thresholds can be effective in improving adaptation performance. These adaptation methods may be readily implemented to improve real-world ASR engine accuracy at specific installations.

Many variants are within the scope of the present invention. Thus, for example, the representation module (i.e., the basic signal processing and feature extraction) of the ASR algorithm may be adapted to enhance recognition performance. In addition, more sophisticated approaches to filtering the adaptation data may be implemented. Further, "regional" confidence measures—wherein confidences are attached to individual recognition units (e.g, words or phonemes)—may be developed so more of the data can be used to adapt the models.

In this approach, it is not necessary to exclude an entire utterance from the adaptation process because it has a low confidence. Instead, some of the data from the utterance may be salvaged and used as input to the model tuning.

The inventive technique may be used within or as an adjunct to a known recognition engine. As is well known, the recognition engine receives a spoken input and may generate multiple recognition hypotheses. This is a known function that is available from several prior art systems (namely, recognition systems, applications and the like) including, without limitation, the Vpro™ speech recognition engine, the VR Speech Recognition engine, and the SpeechWave™ line of speech recognition products, all currently developed and marketed by VCSI. In general, any speech recognition engine that employs acoustic models, language models, pronunciation models, and or a parametric search algorithm may be configured to use the approach described herein.

The algorithms in accordance with the invention preferably comprise software, and thus one of the preferred implementations of the invention is as a set of instructions (program code) in a code module resident in the random access memory of a general purpose computer. Until required by the computer, the set of instructions may be stored in another computer memory, e.g., in a hard disk drive or in a removable memory such as an optical disk (for eventual use in a CD ROM) or a floppy disk (for eventual use in a floppy disk drive), or downloaded via the Internet or some other computer network. In addition, although the various methods described are conveniently implemented in a computer selectively activated or reconfigured by software, one of ordinary skill in the art would also recognize that such methods may be carried out in hardware, in firmware, or in more specialized apparatus or devices constructed to perform the required method steps.

A representative computer on which the inventive operation is performed has a processor (e.g., Intel®-, PowerPC®- or RISC®-based), random access or other volatile memory, disc storage, a display having a suitable display interface, input devices (mouse, keyboard, and the like), and appropriate communications devices for interfacing the computer to a computer network. Random access memory supports a computer program that provides the functionality of the present invention.

Having thus described our invention, what we claim as new and desire to secure by Letters Patent is set forth in the following claims.

The invention claimed is:

1. A method of improving the recognition accuracy of a speech recognizer comprising the steps of:
deploying the speech recognizer in an environment to receive live input data;
receiving the live input data and an original speech signal;
without supervision, selecting at least one adaptation algorithm from a plurality of adaptation algorithms, and applying the selected adaptation algorithm to the received live input data, said live input data and original speech signal being in the form of speech data required for executing the adaptation algorithm, as it is being recognized to improve at least one application-specific feature for the recognition accuracy of the speech recognizer; and
redeploying the adapted speech recognizer in the target environment.

2. The method as described in claim 1 wherein the live input data includes digitally-encoded speech waveform samples.

3. The method as described in claim 1 wherein the live input data includes a processed version of given speech waveform samples, wherein the processed version is not capable of being recognized by a human listener yet is sufficient for use as input to the given adaptation algorithm.

4. The method as described in claim 1 wherein the live input data and associated recognition responses are collected over a given time period.

5. The method as described in claim 1 wherein the adaptation algorithm is based on an acoustic model.

6. The method as described in claim 5 wherein the acoustic model is a Hidden Markov Model.

7. The method as described in claim 1 wherein the adaptation algorithm is based on a language model.

8. The method as described in claim 7 wherein the language model comprises Word Bigram Statistics.

9. The method as described in claim 1 wherein the adaptation algorithm is based on a pronunciation model.

10. The method as described in claim 9 wherein the pronunciation model is encoded in a phonetic transcription lexicon.

11. The method as described in claim 1 wherein the adaptation algorithm is based on search parameters of a recognition algorithm of the speech recognizer.

12. The method as described in claim 11 wherein the speaker-independent adaptation algorithm is selected from the group of models consisting essentially of acoustic models, language models, pronunciation models, search parameters, and combinations thereof.

13. The method as described in claim 1 wherein the adaptation algorithm is based on a combination of models selected from the group consisting essentially of acoustic models, language models, pronunciation models, and search parameters of a recognition algorithm of the speech recognizer.

14. The method as described in claim 1 wherein the adaptation is applied as live input data is collected and recognition response to that live input data are generated.

15. A method of improving the recognition accuracy of a speech recognizer deployed in an environment to receive live input data, comprising the steps of:
receiving live input data and an original speech signal; and
without supervision, selecting at least one adaptation algorithm from a plurality of adaptation algorithms, and applying a given speaker-independent adaptation algorithm to the received live input data, said live input data and original speech signal being in a form of speech data required for executing the adaptation algorithm, as it is being recognized to improve the recognition accuracy of the speech recognizer.

16. The method of claim 1, wherein the at least one application-specific feature is selected from the group consisting of channel characteristics, dialects, pronunciation idiosyncrasies and speaking style.

* * * * *